April 16, 1963    B. C. DOUGLAS    3,085,715
LIQUID DISPENSER
Filed Jan. 30, 1961
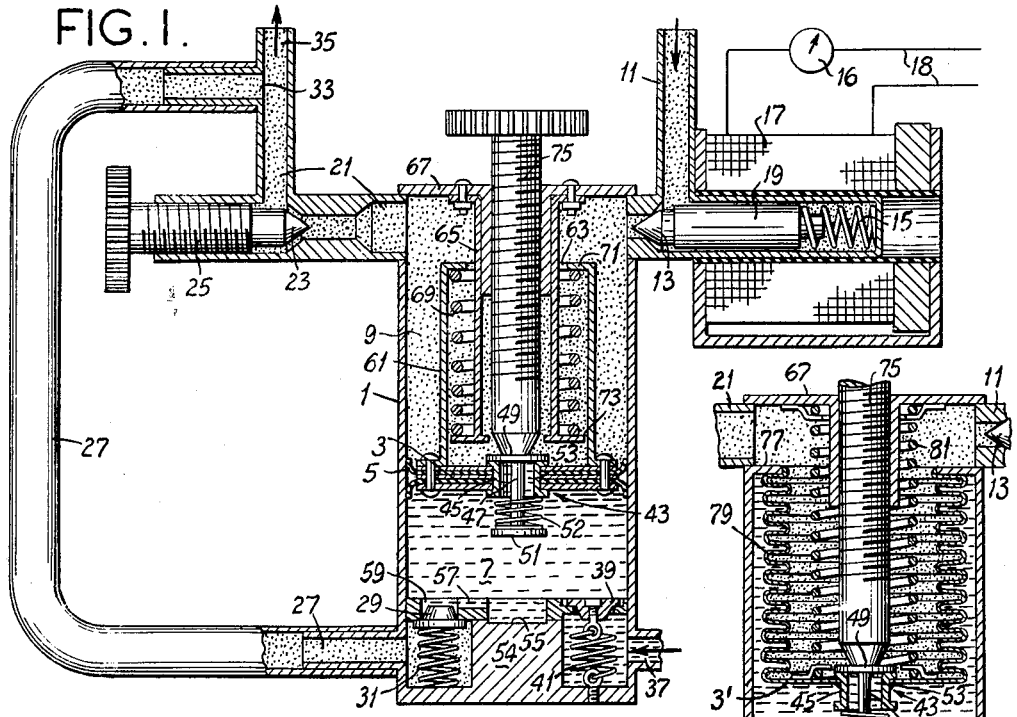
FIG. 1.
FIG. 3.
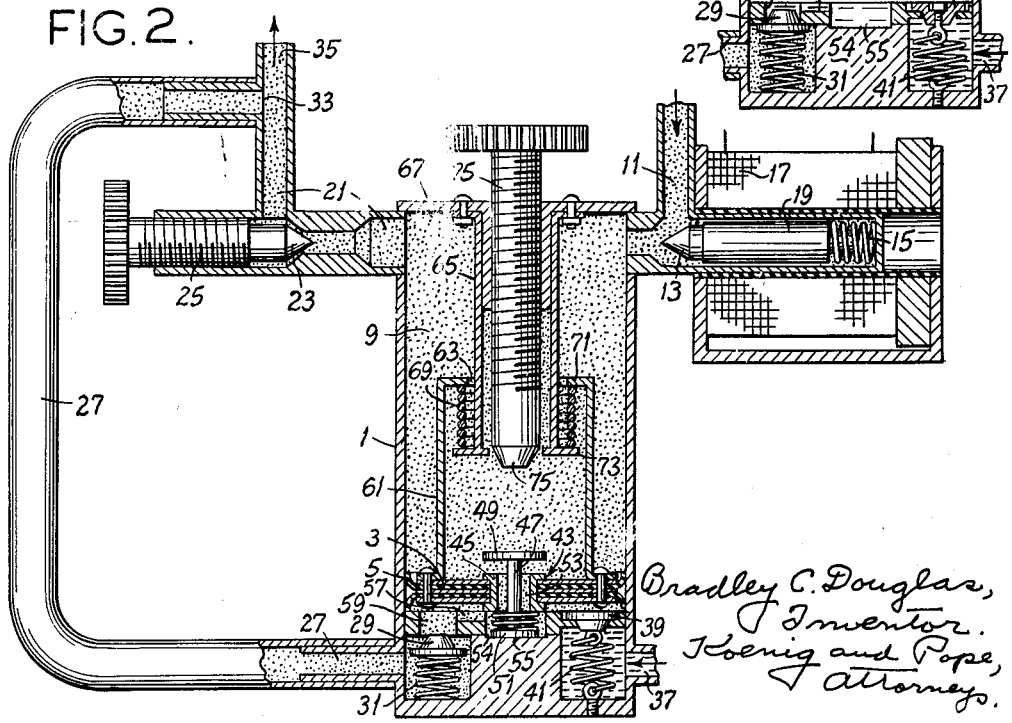
FIG. 2.
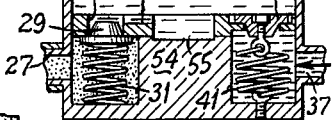
Bradley C. Douglas,
Inventor.
Koenig and Pope,
Attorneys.

United States Patent Office 3,085,715
Patented Apr. 16, 1963

3,085,715
LIQUID DISPENSER
Bradley C. Douglas, Kirkwood, Mo., assignor to Micro Controls, Inc., St. Louis, Mo., a corporation of Ohio
Filed Jan. 30, 1961, Ser. No. 85,661
11 Claims. (Cl. 222—70)

This invention relates to liquid dispensers for dishwashers, clothes washers and the like, and with regard to certain more specific features, to such dispensers for liquid soaps, detergents, water softeners, bleaches and like substances.

Among the several objects of the invention may be noted the provision of a reliable dispenser for a liquid such as soap, detergent, water softener, bleach or the like, adapted for use with a dishwasher, washing machine, or other device requiring a metered charge of liquid at appropriate intervals; the provision of a device of the class described which will measure and dispense a desired liquid charge; and the provision of a device of the class described which is free of tendencies of such liquids during nonuse to corrode or clog the supply lines between the dispenser and the machine receiving the metered charge. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is a vertical section through apparatus diagrammatically illustrating the invention in one position of parts;

FIG. 2 is a view similar to FIG. 1, showing another position of parts; and

FIG. 3 is a fragmentary view similar to parts of FIG. 1, showing an alternative construction of certain plunger parts.

Corresponding reference characters indicate corresponding parts throughout the several views of the drawings.

Hereinafter substances such as soaps, detergents, water softeners and bleaches will be referred to by the generic term liquid to designate the substance to be measured.

Automatic washers for dishes, clothes and the like, in addition to the usual water fill require a charge of a soap, detergent, water softener, bleach or the like. It is preferable that this charge be in liquid form and dispensed with a fair degree of uniformity of measure. Freedom from clogging, such as usually occurs in piping carrying such liquids, is required. By means of the present invention, there is obtained reliable automatic liquid measurement and dispensing without clogging difficulties.

Referring now more particularly to FIGS. 1 and 2, there is shown at numeral 1 a cylinder in which is a movable plunger in the form of a piston 3 having a sliding sealing ring 5. This piston 3 divides the cylinder 1 into a lower liquid-measuring chamber 7 and an upper water-pressure chamber 9. Connected with the upper pressure chamber 9 is a water inlet 11 under control of a water inlet valve 13, the latter being biased to a normally closed position by means of a spring 15. Valve 13 is adapted to be drawn to an open position against bias of spring 15 by excitation of a solenoid coil 17, operative upon an armature core 19 connected with valve 13. Valve 13 is shown closed in FIG. 1 and open in FIG. 2. A suitable timing switch 16 is used in the circuit 18 of the solenoid coil 17 for controlling excitation and deexcitation of the latter. The switch may be of the manually operated variety or it may be a suitable interval timer.

At numeral 21 is shown a water outlet from the upper water-pressure chamber 9. In the outlet 21 is a throttle valve 23 adapted for manual adjustment by a screw part 25. At numeral 27 is indicated a pipe connection between the water outlet 21 and an outlet check valve 29 located in the bottom of the measuring chamber 7. The valve 29 is biased to a normally closed position by means of a compression spring 31. Extending from a junction 33 between the water outlet 21 and the pipe 27 is a mixture outlet 35. At numeral 37 is shown a liquid inlet. This connects a conventional liquid supply under atmospheric pressure (not shown) with the measuring chamber 7, the connection being through an inlet check valve 39. Valve 39 is biased toward a closed position by a tension spring 41.

The piston 3 is provided with a transfer valve generally indicated by numeral 43. This consists of a sleeve 45 providing a transfer port in the piston, in which is a stem 47. Stem 47 has an upper head 49 and a lower head 51. A spring 52, reacting between the sleeve 45 and head 51, normally biases the valve 43 into the closed position shown in FIG. 1, wherein head 49 seats on the sleeve 45. This closes the transfer opening 53 afforded by the sleeve 45 through the plunger 3. When the plunger is in its lower position shown in FIG. 2, adjacent an end wall 54 of cylinder 1, the valve head 51 contacts the bottom of a recess 55 in wall 54, with the result that the head 49 is lifted to open the transfer passage 53. Connecting the recess 55 and an inlet portion 59 adjacent the valve 29 is a passage 57. This affords access of any transferred liquid to the valve 29 when the piston is adjacent the head 54.

Provision is made for biasing plunger 3 to an initial measuring position as shown in FIG. 1. This biasing arrangement consists of a cup 61, attached to the top of the piston 3 and having therein an opening 63 surrounding a sleeve 65. Sleeve 65 extends down from the top closure 67 of the cylinder 1. A compression spring 69 is located between flanges 71 and 73 on the members 61 and 65, respectively. Thus when the piston 3 is pushed down, the spring 69 is compressed. Upon reduction in pressure on the piston 3, the spring 69 expands to return the piston 3 to its initial measuring position shown in FIG. 1. This initial position is determined by contact of the head 49 with the end of an adjusting screw 75 which determines the measuring stroke of the piston 3.

Operation is as follows, referring first to FIG. 1:

Assume the usual water supply under pressure to be connected with the inlet 11. Valve 13 is closed. Assume also that the device has been suitably primed from previous operations. Therefore (as shown by stippling) water will be infilled in the cylinder 1 above the piston 3, some also being in the outlet 21. The pipe 27 and the space under check valve 29 will also be infilled with water. The water is indicated by stippling. The space 7 under the raised piston 3, which constitutes a measuring chamber, is infilled with liquid to be dispensed. This liquid is illustrated by broken horizontal lines.

To operate the device, the solenoid 17 is excited by closure of switch 16. This opens valve 13. Water under pressure then enters the inlet 11. Being throttled at the outlet throttle valve 23, a pressure drop appears across this valve. Therefore, the pressure in the measuring chamber 7 is substantially less than that in the water-pressure chamber 9. As a result, piston 3 is forced down and expels the measured liquid charge from chamber 7 through valve 29, pipe 27, and pipe 35 to the washer. At the end of the stroke, as indicated in FIG. 2, the transfer valve 43 opens, which admits water under pressure through the valve 43 to the space 59. This water escapes through open valve 29. The advancing water purges or scavenges pipe 27 of all liquid (detergent or the like) therein, which is driven ahead of the water. The period of excitation of the solenoid 17 is such as to assure a complete water scavenging effect in lines 27 and 35 after the liquid charge has been dispensed.

Upon deexciting the solenoid 17, the valve 13 closes. This stops the flow of water. As a result, the pressure drop across valve 23 tends to be reduced. Therefore, the imbalance of pressure between the water-pressure chamber 9 and the liquid-measuring chamber 7 becomes reduced. Finally, the imbalance becomes reversed by action of the compressed spring 69, which moves the piston 3 up to its initial position. When the piston 3 rises, valve 29 is closed while valve 39 opens, permitting the piston 3 to draw into the measuring chamber 7 the next-to-be-dispensed liquid charge. In the process some water from the pressure chamber 9 is gradually driven through the valve 23 to the outlet 35.

The water passing through pipe 27 during the purging or scavenging operation is received by the washer as part of its required water charge. It will also be understood that the main water charge for the washer may be supplied by another valve-controlled inlet thereto (not shown) or the entire water charge may be obtained through the present device by maintaining the excitation of the solenoid valve 17 to hold open the valve 13 long enough to effect such a complete water charge.

While the plunger may be constructed as a piston 3, as shown in FIGS. 1 and 2, a flexible diaphragm type of plunger may be employed (as shown in FIG. 3, wherein like numerals designate like parts), In this case the cylinder 1 is inwardly flanged at the top, as shown at 77, for sealing attachment thereto of one end of a flexible bellows 79. The other end of the bellows 79 is attached to a diaphragm 3′ which becomes a plunger which is the equivalent of the piston form of plunger 3 shown in FIG. 1. This member 3′ is provided with a valve 43 of the same form and function as that shown in connection with the plunger 3 of FIGS. 1 and 2. A tension spring 81 is anchored at one end to the diaphragm 3′ and at the other end to the head 67 of the cylinder 1. This biases the plunger-forming element 3′ to the initial position above-mentioned. Operation of the FIG. 3 form of the invention will be obvious from the description above given in connection with the form shown in FIGS. 1 and 2.

In view of the above, it will be seen that the device provides not only for discharging accurately measured amounts of liquid charges into the washing machines, but it also provides for purging or scavenging the pressure-equalizing pipe 27 along with the liquid supply lines of liquid, such as might have a tendency to corrode or clog during intervals of nonuse. Water standing in pipes such as 27, 33 and 35 of course has no substantial corrosive or clogging effect. The device is adaptable to manual operation or clock-timed operations, with or without the function of supplying water for the main water fill of the washer.

It will be apparent that for the throttle valve 23 may be substituted other forms of throttle valves such as, for example, an adjustable spring-loaded outlet check valve which opens in response to pressure drop across it, the amount of pressure drop for holding it open being subject to adjustment of the spring tension against the valve. For purposes of the invention, such a valve is the equivalent of the throttle valve 23 as illustrated in the drawings, and the term throttle valve as used herein is intended to describe either of these valve forms.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A liquid dispenser for washers and the like comprising means forming a compartment, movable plunger means therein dividing the compartment into a water-pressure chamber and a liquid-measuring chamber, means biasing the plunger to an initial position, said water-pressure chamber having a water inlet and a water outlet, said liquid-measuring chamber having a liquid inlet and a liquid outlet, a normally closed but openable inlet valve in said water inlet, means adapted to open and close said water inlet valve, a throttle valve connecting the water-pressure chamber with said water outlet, an inlet check valve in said liquid inlet, an outlet check valve in said liquid outlet, connecting means between the downstream side of said liquid outlet check valve and the downstream side of said throttle valve, said plunger having an opening therethrough, a normally closed transfer valve controlling said opening, and means adapted to open said transfer valve in response to predetermined movement of the plunger in response to water pressure when said water inlet valve is opened.

2. A liquid dispenser according to claim 1, including stop means mounted on the means forming the compartment, said stop means being engageable by said plunger adapted to determine the location of said initial position.

3. A liquid dispenser according to claim 2, including means for adjusting said stop means.

4. A liquid dispenser according to claim 3, wherein said throttle valve is adjustable to vary the pressure drop across it.

5. A liquid dispenser according to claim 4, including solenoid operating means for said water inlet valve and a switching circuit for the solenoid.

6. A liquid dispenser according to claim 5, including an interval timer in the switching circuit.

7. A liquid dispenser for washers and the like comprising means forming a cylinder having a first head adjacent a first end thereof and a second head adjacent a second end thereof, a movable plunger in the cylinder dividing it into a water-pressure chamber adjacent its first end and a liquid-measuring chamber adjacent its second end, means biasing the plunger to an initial position, stop means fixed with respect to said first head and determining said initial position, said water-pressure chamber having a water inlet and a water outlet, said liquid-measuring chamber having a liquid inlet and a liquid outlet, a normally closed but openable inlet valve in said water inlet, means adapted to open and close said water inlet valve, a throttle valve connecting the pressure chamber with said water outlet, a liquid inlet check valve in said liquid inlet, an outlet check valve in said liquid outlet, connecting means adapted to carry liquid from the downstream side of said liquid outlet check valve to said water outlet on the downstream side of said throttle valve, said plunger having an opening therethrough, a transfer valve in said opening, means normally biasing said transfer valve shut against flow from the water-pressure chamber to the liquid-measuring chamber, and means fixed relative to said second head adapted to be contacted by and to open said transfer valve upon movement of the piston to a point adjacent said second head, whereby a water flow is established between the water-pressure chamber through the liquid-measuring chamber, through said outlet check valve and to said connecting means to scavenge the latter of liquid previously introduced therein by movement of said plunger toward said first head.

8. A liquid dispenser according to claim 7, wherein said plunger is in the form of a piston having a slidable seal with the cylinder.

9. A liquid dispenser according to claim 7, wherein said plunger is in the form of a flexible diaphragm means connected with the cylinder.

10. A liquid dispenser for first and second liquids, comprising means forming a compartment, movable plunger means therein dividing the compartment into a pressure chamber for a first liquid under pressure and a measuring chamber for a second liquid, means biasing the plunger to an initial position, said pressure chamber having a first inlet and a first outlet for the first liquid, said measuring chamber having a second inlet and a second outlet for the second liquid, a normally closed but openable inlet valve in said first inlet, a throttle valve adapted to connect the pressure chamber with said first outlet, an inlet check valve in said second inlet through which the second liquid is drawn into the measuring chamber upon movement of said plunger toward its initial position, an outlet check valve in the second outlet, said plunger having an opening therethrough, a normally closed transfer valve controlling said opening, and means adapted to open said transfer valve in response to predetermined movement of the plunger away from its initial position in response to pressure of the first liquid when said first inlet is opened, whereby the first liquid enters the measuring chamber to force the second liquid therefrom.

11. A liquid dispenser according to claim 10, including means adapted to bring said liquids together after their movements from their respective outlets.

References Cited in the file of this patent

UNITED STATES PATENTS 2,538,111  Luster _____ Jan. 16, 1951